United States Patent
Yuge (10) Patent No.: US 10,038,191 B2
(45) Date of Patent: Jul. 31, 2018

(54) CARBONOUS ANODE MATERIAL, METHOD FOR PRODUCING THE SAME, AND LITHIUM-ION BATTERY CONTAINING THE ANODE MATERIAL

(71) Applicant: NEC Corporation, Minato-ku, Tokyo (JP)

(72) Inventor: Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 14/910,049

(22) PCT Filed: Aug. 7, 2014

(86) PCT No.: PCT/JP2014/070834
§ 371 (c)(1),
(2) Date: Feb. 4, 2016

(87) PCT Pub. No.: WO2015/025722
PCT Pub. Date: Feb. 26, 2015

(65) Prior Publication Data
US 2016/0181613 A1 Jun. 23, 2016

(30) Foreign Application Priority Data
Aug. 23, 2013 (JP) .................................. 2013-173621

(51) Int. Cl.
*H01M 4/587* (2010.01)
*H01M 10/0525* (2010.01)
(Continued)

(52) U.S. Cl.
CPC ........... *H01M 4/587* (2013.01); *H01M 4/133* (2013.01); *H01M 4/364* (2013.01);
(Continued)

(58) Field of Classification Search
None
See application file for complete search history.

(56) References Cited

U.S. PATENT DOCUMENTS

| 2008/0145757 A1* | 6/2008 | Mah ...................... H01M 4/133 429/219 |
| 2008/0220329 A1* | 9/2008 | Kojima .................. C04B 35/83 429/188 |

(Continued)

FOREIGN PATENT DOCUMENTS

| JP | 2006-117461 A | 5/2006 |
| JP | 2006-318868 A | 11/2006 |

(Continued)

OTHER PUBLICATIONS

English translation of JP2012-214342. Kosaka. dated Nov. 8, 2012. (Year: 2012).*

(Continued)

*Primary Examiner* — Jonathan G Leong
*Assistant Examiner* — Christopher P Domone (57) ABSTRACT

The present invention provides an anode material for a lithium-ion battery, the anode material being excellent in the low resistance and the rate characteristics, and meeting the fast charge/discharge characteristics and the relaxation of the characteristics deterioration due to the volume expansion simultaneously in high levels. In the present invention, there is produced a carbonous anode material comprising a composite (7) of a low-crystalline carbon (6), a fibrous carbon (2) having a smaller diameter than the particle diameter of the low-crystalline carbon (6), and a carbon nanohorn (3), by dispersing a low-crystalline carbon precursor (1), the fibrous carbon (2), and the carbon nanohorn (3) in a disperse medium (4) to form a carrier (5) having the carbon nanohorn (3) supported on the precursor (1) and the fibrous carbon (2), separating the carrier (5) from the disperse medium (4), and thereafter subjecting the resultant to a heat treatment to convert the precursor (1) to the low-crystalline carbon (6).

7 Claims, 4 Drawing Sheets

(51) Int. Cl.
  *H01M 4/133* (2010.01)
  *H01M 4/36* (2006.01)
  *H01M 4/02* (2006.01)
(52) U.S. Cl.
  CPC .. *H01M 10/0525* (2013.01); *H01M 2004/027* (2013.01); *H01M 2220/20* (2013.01); *H01M 2220/30* (2013.01); *Y02T 10/7011* (2013.01)

(56) References Cited

U.S. PATENT DOCUMENTS

| | | | | |
|---|---|---|---|---|
| 2008/0245553 | A1* | 10/2008 | Sakai | B82Y 10/00 174/257 |
| 2010/0177462 | A1* | 7/2010 | Adzic | B82Y 30/00 361/502 |
| 2012/0077089 | A1 | 3/2012 | Sakata et al. | |
| 2012/0288750 | A1* | 11/2012 | Kung | H01B 1/04 429/188 |

FOREIGN PATENT DOCUMENTS

| | | |
|---|---|---|
| JP | 2008-066053 A | 3/2008 |
| JP | 2010-123437 A | 6/2010 |
| JP | 2010-129169 A | 6/2010 |
| JP | 2012-094503 A | 5/2012 |
| JP | 2012-214342 A | 11/2012 |
| JP | 2013-084601 A | 5/2013 |
| WO | 2011/046157 A1 | 4/2011 |
| WO | 2013/183187 A1 | 12/2013 |

OTHER PUBLICATIONS

International Search Report for PCT Application No. PCT/JP2014/070834, dated Nov. 11, 2014.
Japanese Office Action for JP Application No. 2015-532803 dated Jun. 12, 2018 with English Translation.

* cited by examiner

CARBONOUS ANODE MATERIAL, METHOD FOR PRODUCING THE SAME, AND LITHIUM-ION BATTERY CONTAINING THE ANODE MATERIAL

This application is a National Stage Entry of PCT/JP2014/070834 filed on Aug. 7, 2014, which claims priority from Japanese Patent Application 2013-173621 filed on Aug. 23, 2013, the contents of all of which are incorporated herein by reference, in their entirety.

TECHNICAL FIELD

The present invention relates to a carbonous anode material, a method for producing the same, and a lithium-ion battery containing the anode material.

BACKGROUND ART

In recent years, along with the reduction in size and weight and the performance enhancement of mobile phones, notebook computers, electric cars and the like, lithium-ion batteries having a light weight and a large charge capacity are broadly utilized as secondary batteries to be used for these apparatuses. Then in the applications to electric cars, electric power tools and the like, the insufficiency in the large current load characteristics is a big problem. As countermeasures thereto, there are proposed, particularly for negative electrodes, the resistance reduction in the electrodes and the adoption of materials excellent in the rate characteristics, such as hard carbon and soft carbon, to active substances.

For example, Patent Document 1 (JP2010-129169A) discloses a negative electrode material which is obtained by mixing a carbon nanotube and a thermoplastic resin and heating them in an inert gas to thereby coat the carbon nanotube with carbon by the pyrolysis, for the purpose of suppressing an increase in the initial irreversible capacity when a carbon nanotube having a possibility of producing a larger reversible capacity than graphite is used as an anode material.

Further Patent Document 2 (JP2010-123437A) discloses that by mixing a graphite material of a negative electrode with a carbon nanohorn aggregate as an auxiliary conductive agent, there can be obtained a long-life lithium-ion battery which is low in the reaction resistance and low in the volume expansion coefficient, and causes no rapid capacity deterioration.

Patent Document 3 (JP2008-66053A) discloses a method for fabricating a nanotube integrated with hard carbon (HC) or soft carbon (SC), the method involving mixing a precursor of carbon particles to become a core with a metal-containing compound and heat-treating the mixture, and also discloses lithium-ion battery characteristics.

Further Patent Document 4 (JP2006-117451A) discloses a method of obtaining a composite carbonized material. This method involves first subjecting phenols and aldehydes to an addition condensation reaction in the presence of a reaction catalyst while carbon nanofibers and a dispersant are being mixed therewith. Thereby, a phenol resin globularly aggregates while being incorporating the carbon nanofibers to thereby form a carbon nanofiber-phenol resin composite material composed of globular particles of the phenol resin containing the carbon nanofibers homogeneously dispersed therein. It is disclosed that the composite material is further heat-treated to thereby obtain a carbon nanofiber-phenol resin composite carbonized material in which the phenol resin has been carbonized. In this composite carbonized material, the carbon nanofibers are homogeneously dispersed in the carbonized substance of the phenol resin, and it is contended that the effect of improving the electroconductivity can be highly attained by compositing the carbon nanofibers.

CITATION LIST

Patent Document

Patent Document 1: JP2010-129169A
Patent Document 2: JP2010-123437A
Patent Document 3: JP2008-66053A
Patent Document 4: JP2006-117451A

SUMMARY OF INVENTION

Technical Problem

Patent Document 2 contends the followings: the carbon nanohorns get into negative electrode active materials due to its high dispersibility; consequently, the electroconductivity between the negative electrode active materials is enhanced; and further, the battery can be elongated in its life since the carbon nanohorns function as a buffer material against expansion and swelling of electrode constituents such as the active material and a binder.

Conventional anode materials, however, cannot meet the fast charge/discharge characteristics and the relaxation of the characteristics deterioration due to the volume expansion simultaneously in high levels. One embodiment of the present invention is intended for providing an anode material being excellent in the low resistance and the rate characteristics, and meeting the fast charge/discharge characteristics and the relaxation of the characteristics deterioration due to the volume expansion simultaneously in high levels. Another embodiment of the present invention is intended for providing a method for producing a negative electrode active material capable of simply and inexpensively providing such an anode material.

Solution to Problem

That is, according to one aspect of the present invention, there is provided a carbonous anode material comprising a composite of a low-crystalline carbon, a fibrous carbon having a smaller diameter than the particle diameter of the low-crystalline carbon, and a carbon nanohorn.

Further according to another aspect of the present invention,
there is provided a method for producing a carbonous anode material, the method comprising:
dispersing a low-crystalline carbon precursor, a fibrous carbon, and a carbon nanohorn in a disperse medium to thereby form a carrier in which the carbon nanohorn is supported on the low-crystalline carbon precursor and the fibrous carbon; and
converting the low-crystalline carbon precursor to a low-crystalline carbon by heating after the carrier is separated from the disperse medium.

Further, according to another aspect of the present invention,
there is provided a method for producing a carbonous anode material, the method comprising:

dispersing a fibrous carbon and a carbon nanohorn in a solution containing a low-crystalline carbon precursor to thereby obtain a mixed liquid;

subjecting the mixed liquid to a first heat treatment under pressure to thereby carbonize the low-crystalline carbon precursor, and obtaining a preparation in which the fibrous carbon and the carbon nanohorn are coated with a carbonized substance of the low-crystalline carbon precursor; and subjecting the preparation to a second heat treatment to thereby convert the carbonized substance to a low-crystalline carbon.

Additionally, according to yet another aspect of the present invention, there is provided a lithium-ion battery using the above carbonous anode material or the carbonous anode material obtained by the above method as its negative electrode active material.

Effects of Invention

According to the carbonous anode material according to the one aspect of the present invention, the electroconductivity of the low-crystalline carbon excellent in the rate characteristics is improved, and due to the connection through a plurality of particles by the fibrous carbon, the contact resistance between the particles can be reduced. Further due to the integrated incorporation of the carbon nanohorn in the inside of and on the surface of the low-crystalline carbon, the migration of lithium ions is made easy, which is suitable for good fast charge and discharge characteristics. Further due to the connection between the particles by the fibrous carbon and the voids produced in the inside of and on the surface of the low-crystalline carbon by the carbon nanohorn, the relaxation of the characteristics deterioration due to the volume expansion can be met in high levels.

Further, according to the production methods according to another aspects, the above carbonous negative electrode material is enabled to be provided simply and inexpensively.

DESCRIPTION OF EXEMPLARY EMBODIMENTS

Hereinafter, one exemplary embodiment will be described in detail referring to the drawings, but the present invention is not limited to the exemplary embodiment.

[1. A Carbonous Anode Material]

A carbonous anode material according to the present invention includes a composite of a low-crystalline carbon, a fibrous carbon having a smaller diameter than the particle diameter of the low-crystalline carbon, and a carbon nanohorn. The carbonous anode material is particularly a composite including the carbon nanohorn incorporated in the inside of and in the vicinity of the surface of the low-crystalline carbon, and the fibrous carbon incorporated in a plurality of particles of the low-crystalline carbon and connecting between the plurality of particles, and differs from a simple mixture.

The low-crystalline carbon according to the present invention is an easily graphitizable carbon (soft carbon) particle or a hardly graphitizable carbon (hard carbon) particle, and is a carbon material lower in crystallinity than a high-crystalline carbon (for example, graphite). The low-crystalline carbon differs also from amorphous carbon, which has no crystallinity at all. The low-crystalline carbon is excellent in the rate characteristics as described in Background Art. The low-crystalline carbon usually enlarges in the course of carbonizing its precursor and incorporates the fibrous carbon and the carbon nanohorn therein.

The fibrous carbon according to the present invention has a smaller diameter than the particle diameter of the low-crystalline carbon. The length of the fibrous carbon is not especially specified, but is preferably longer than the particle diameter of the low-crystalline carbon, and it is a length capable of being incorporated in the plurality of particles of the low-crystalline carbon and simultaneously connecting between the particles. The fibrous carbon is usually a nano carbon fiber having a diameter of 1 μm or smaller, and especially preferably a carbon nanotube. The carbon nanotube is a tubular substance formed from graphite layers (called graphene sheets or the like) having a six-membered ring of carbon atoms as a basic skeleton. The carbon nanotube is classified, for example, into a single-wall carbon nanotube composed of one cylindrical sheet, a double-wall carbon nanotube having a telescopic structure of two layers of cylindrical sheets, and a multi-wall carbon nanotube having a telescopic structure of three or more layers of cylindrical sheets. The length of the carbon nanotube is, for example, several micrometers. The diameter of the carbon nanotube is, in a single-wall carbon nanotube, for example, about 0.4 to 2 nm, and in a multi-wall carbon nanotube, for example, several tens to several hundreds of nanometers.

On the other hand, the carbon nanohorn in the present exemplary embodiment is in a shape of a conical shape in which a tip of a rolled graphene sheet is closed, for example, sharpened in a horn-like with a tip angle of about 20°. The shape of one piece of the carbon nanohorn is about 1 nm to 5 nm in diameter and about 10 nm to 250 nm in length. The carbon nanohorn can be produced, for example, by a laser abrasion method in which a carbonaceous material (graphite or the like) is irradiated with carbon dioxide gas laser or the like, an arc discharge method, or the like. Usually, the carbon nanohorn, for example, can aggregate radially with tip portions of its conical shape on the outside, and form a globular carbon nanohorn aggregate of, for example, about 100 nm in diameter. The carbon nanohorn aggregate includes aggregates of any shapes of 30 to 500 nm in diameter, and preferably 30 to 200 nm in diameter. Further the carbon nanohorn or the carbon nanohorn aggregate also includes ones of a dahlia type, which has a long horn structure, a bud type and a seed type, which have a short horn structure, and a petal structure, in which the horn portion becomes platy (the graphene sheet takes a layer structure). Details of the carbon nanohorn and its aggregate are described, for example, in JP2012-41250A and the like by the present inventor.

Although the proportions of the fibrous carbon and the carbon nanohorn in the composite are not especially limited, the carbon nanohorn is preferably 0.1 to 20% by mass, and more preferably 1 to 10% by mass; and the fibrous carbon is 0.1 to 20% by mass, and more preferably 1 to 10% by mass. The remainder is preferably the low-crystalline carbon.

[2. A Method for Producing the Carbonous Anode Material]

Figure 1:
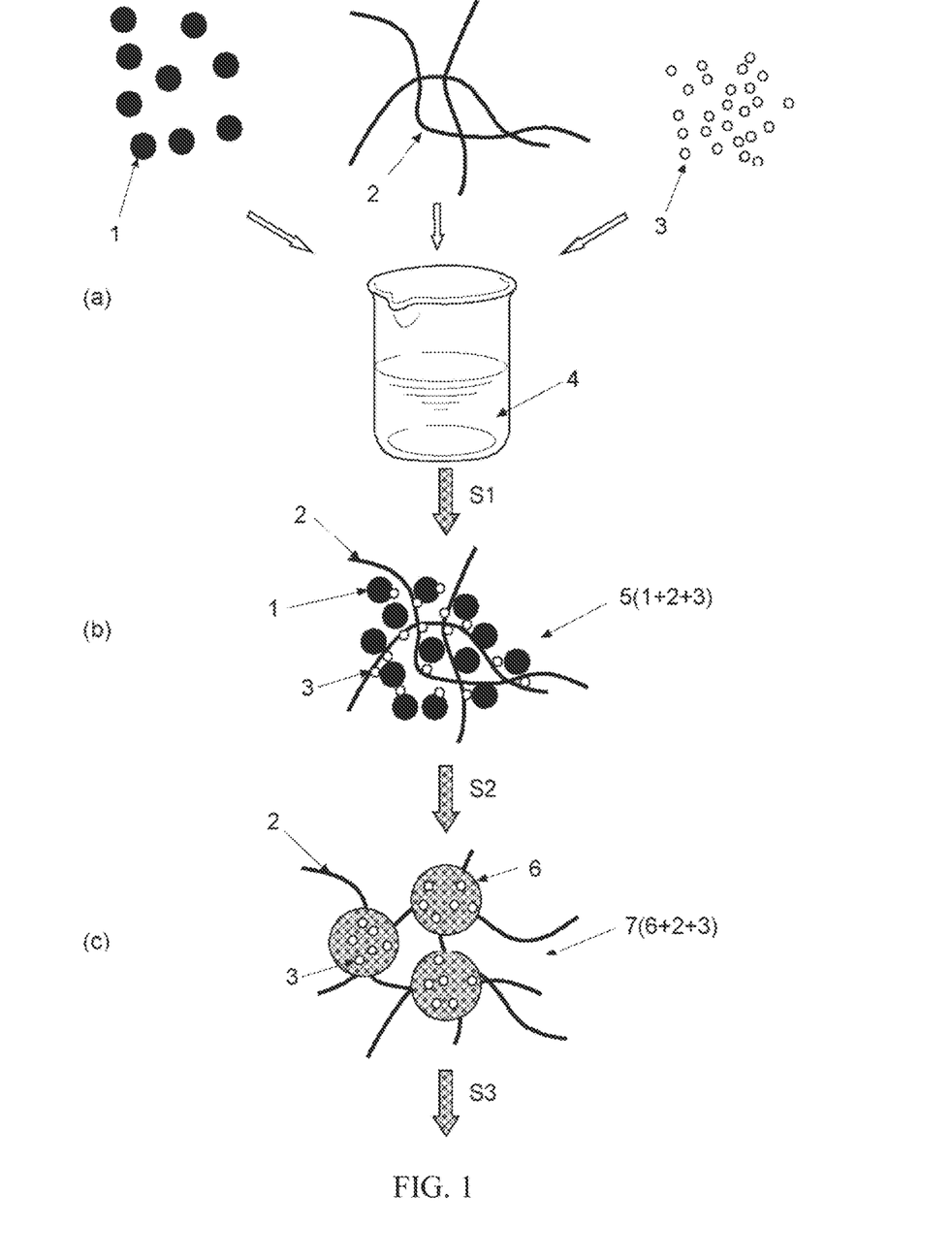
FIG. 1 It is a schematic process diagram interpreting a method for producing an anode material according to one exemplary embodiment of the invention.

(1) The carbonous anode material according to the present invention is prepared as follows. As shown in FIG. 1(a), precursor 1 of a low-crystalline carbon, carbon nanotubes 2 and carbon nanohorn aggregates 3 are dispersed in disperse medium 4. After the disperse medium 4 is separated by filtration or the like, the resultant is dried (S1) to thereby obtain nanohorn carrier 5 in which the carbon nanohorn aggregates 3 are supported on the precursor 1 and the carbon nanotube 2 (FIG. 1(b)). The nanohorn carrier 5 is heat-treated (S2) in an atmosphere containing mainly an inert gas (a rare gas such as Ar or nitrogen gas) or under vacuum, at a temperature of not transforming up to graphite, for example, 400 to 2,000° C. In the heat treatment, the precursor 1 incorporates the nanotubes 2 and the nanohorn aggregates 3 and is enlarged in the course of carbonizing the precursor 1 to transform to the low-crystalline carbon 6, to thereby obtain a composite 7 (FIG. 1(c)). At this time, the nanohorn aggregates 3 are incorporated in the inside of the low-crystalline carbon 6, and a part thereof exposes on the surface. The nanotubes 2 are also incorporated in the inside of the low-crystalline carbon 6, but the incorporation extended over the plurality of particles enables the nanotube 2 to connect through the plurality of particles. The growth of the low-crystalline carbon 6 while being incorporating the fibrous carbon in the carbonization process of the precursor 1 makes the diameter of the low-crystalline carbon 6 to be larger than that of the fibrous carbon.

Figure 2:
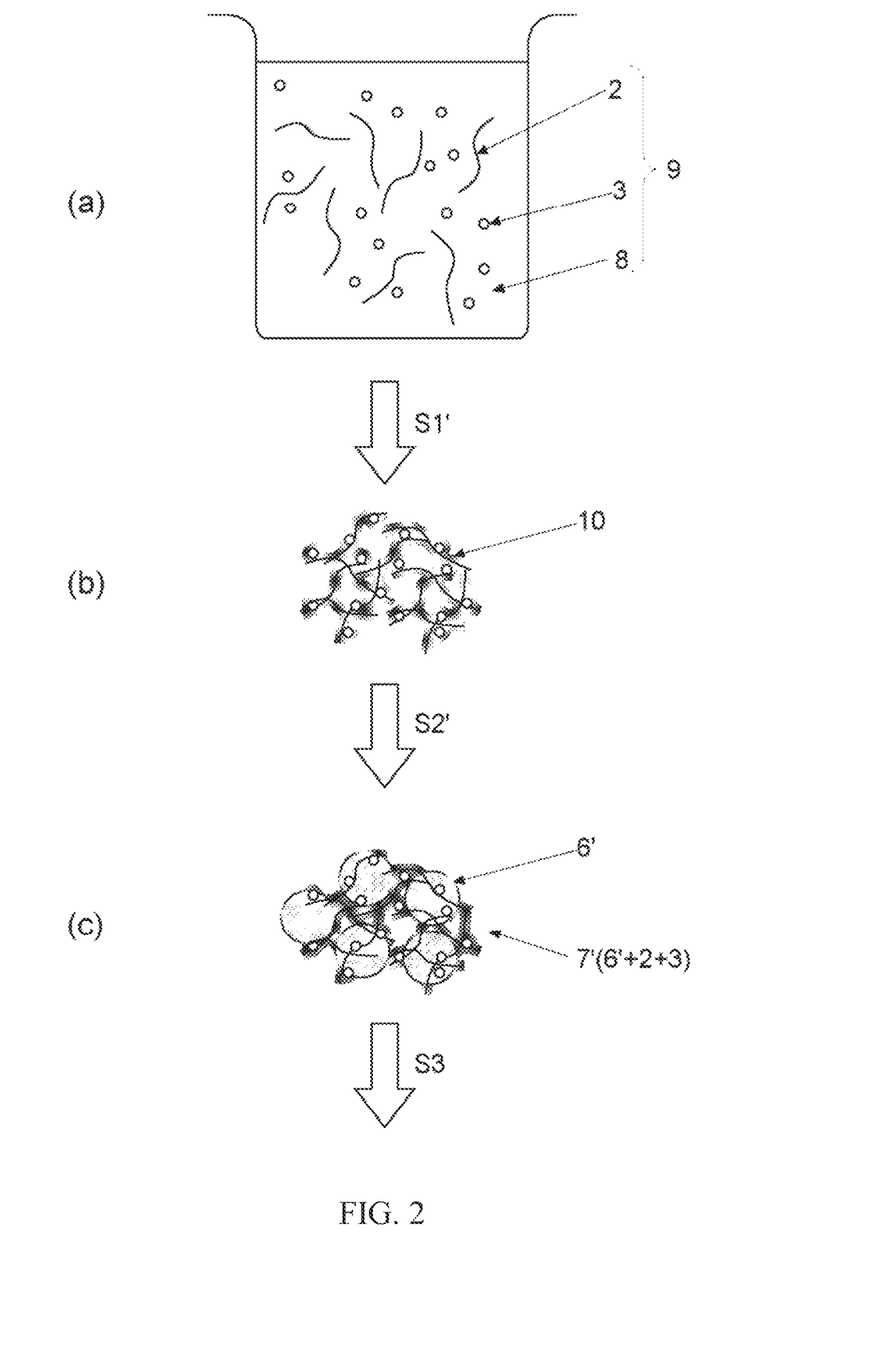
FIG. 2 It is a schematic process diagram interpreting a method for producing an anode material according to another exemplary embodiment of the invention.

(2) The carbonous anode material according to the present invention can also be produced by a method different from the method (1) shown in FIG. 1. For example, as shown in FIG. 2(a), the carbon nanotubes 2 and the carbon nanohorn aggregates 3 are dispersed in a solution 8 in which a precursor of the low-crystalline carbon is dissolved to thereby obtain a mixed liquid 9. The mixed liquid 9 is heat-treated using an autoclave apparatus under a pressure of 0.5 to 15 MPa at 150 to 600° C. to thereby carbonize the precursor (S1'); and the carbon nanotubes 2 and the carbon nanohorn aggregates 3 are coated with a carbonized substance 10 of the precursor (FIG. 2(b)). Thus obtained preparation 11 is baked (S2') in an inert gas or under vacuum at 800 to 2,000° C. to reform and grow the carbonized substance 10 further to a low-crystalline carbon 6' to thereby obtain a composite 7' (FIG. 2(c)).

In the above methods (1) and (2), thereafter, the resultant can be pressurized and heat-treated in an inert gas atmosphere at 150 to 3,000° C. at 0.5 to 20 MPa to thereby raise the degree of crystallinity (S3).

In the method (1), as the disperse medium 4, any of inorganic and organic solvents can be used as long as being a liquid capable of dispersing the precursor 1, the nanotube 2 and the nanohorn aggregate 3, but in consideration of drying, preferably used are organic solvents, including alcohols such as ethanol, methanol and isopropanol (isopropyl alcohol; IPA), aromatic hydrocarbons such as toluene, benzene, benzoic acid and aniline, halogenated hydrocarbons such as dichloroethane, and other organic solvents such as N,N-dimethylformamide. In the method (2), the precursor solution 8 is prepared by using a solvent capable of dissolving the precursor. The solvent capable of dissolving the precursor includes inorganic solvents such as water, and the above organic solvents. Further in the case where the treatment is carried out under pressure by using an autoclave or the like, use of a mixed solvent of water with an organic solvent, particularly with an organic solvent compatible with water is effective.

The soft carbon precursor as the precursor 1 includes oil raw materials such as petroleum pitch, coal pitch and low-molecular heavy oils, and further mesophase pitch obtained by heat treatment at about 400° C. of these raw materials. The hard carbon precursor includes polyimide resins, furan resins, phenol resins, polyvinyl alcohol resins, cellulose resins, epoxy resins, polystyrene resins and saccharides such as sucrose. In the disperse medium 4 in the method (1), the ultrasonic vibration or the like may be imparted so as to miniaturize the precursor into fine oil droplets or fine particles.

The order of the addition of the precursor 1, the nanotube 2 and the nanohorn aggregate 3 to the disperse medium 4 in the method (1) is not especially limited, and can be arbitrary. Further in the methods (1) and (2), a nanotube-nanohorn composite, in which a nanohorn aggregate is joined to a nanotube, may be used in place of the nanotube 2. Although the dispersibility of the nanotube in the disperse liquid is likely to be inferior to that of the nanohorn aggregate, use of the nanotube as the nanotube-nanohorn composite can improve the dispersibility. The nanotube-nanohorn composite can be fabricated by making iron to be supported as a catalyst on the surface of the carbon nanohorn 3, and causing the carbon nanotube to grow from the iron catalyst by a chemical vapor deposition method. As the case may be, both of the nanotube 2 and the nanohorn aggregate 3 can be replaced by the nanotube-nanohorn composite; but, in order to enhance the probability of the presence of the nanohorn aggregate 3 in the vicinity of the surface of the low-crystalline carbon produced from the precursor 1, it is preferable that the nanohorn aggregate 3 be added separately from the nanotube-nanohorn composite. Further in the method (1), by first adding the nanotube 2 and the nanohorn aggregate 3 in the disperse medium 4 and dispersing the mixture by ultrasonic vibration, a nanotube-nanohorn composite not having been joined is made in some cases.

In the drying of the step S1 in the method (1), the disperse medium 4 does not need to be completely removed, and the disperse medium 4 may remain in the range not posing any problem in the handleability of the obtained nanohorn carrier 5. In the step S1' in the method (2), the pressurizing/heating treatment in an autoclave may be carried out after the obtained mixed liquid is condensed to reduce the solvent amount. Particularly when the viscosity of the precursor solution 8 is too high, the dispersibility of the nanotube 2 and the nanohorn aggregate 3 decreases, and therefore after the nanotube 2 and the nanohorn aggregate 3 are mixed and dispersed in a low-viscosity precursor solution 8, followed by removing the solvent within an extent not impairing the handle ability, the resultant may be subjected to the heat treatment. Further, after the nanotube 2 and the nanohorn aggregate 3 are mixed and dispersed in the state that the precursor concentration in the precursor solution 8 is low, the precursor may be supplemented and increase the viscosity. The higher the precursor concentration in the precursor solution 8, the larger the size of the obtained low-crystalline carbon is likely to become.

In the step S2 in the method (1) and the step S2' in the method (2), in the case where the carbonization of the precursor 1 is carried out at a high temperature in an inert gas such as a rare gas such as He, Ne, Ar, Kr or Xe, or nitrogen gas ($N_2$), when carbon dioxide is mixed in the inert gas, the carbon dioxide oxidatively reacts with the graphene sheet structure on the surface of the composite 7 after the carbonization at a temperature of 600° C. or higher, and thus a composite accompanied by nano pores can be obtained. The graphene sheet structure is contained in any of the nanotube 2, the nanohorn aggregate 3 and the low-crystalline carbon 6 or 6', and is not especially limited. The mixing ratio of carbon dioxide in the inert gas is preferably 20 to 80% in volume ratio. Although the mixing of carbon dioxide may be carried out from the start initial stage of the step S2 in the method (1), carbon dioxide may be added at the stage where the carbonization treatment (conversion to the low-crystalline carbon) proceeds to some degree. The temperature profile in the step S2 or S2' is not limited to a trapezoid profile of rising temperature, constant temperature and descending temperature, and may be a stepwise profile like rising temperature, first annealing constant temperature, descending temperature, second annealing constant temperature and descending temperature. Here, the first annealing can involve, for example, a comparatively high-temperature carbonization treatment step (800 to 2,000° C.), and the second annealing can involve an oxidation treatment step (600 to 1,000° C.) using the introduction of carbon dioxide. Although the step S2 or S2' can be carried out in any state of under reduced pressure, under normal pressure or under pressure, the step is preferably carried out under pressure. The pressurizing condition can be 0.5 to 20 MPa as in the step S3.

In the step S3, an inert gas is charged in a closed vessel so as to become a predetermined pressure, and a heat treatment is carried out in the above temperature range. This heat treatment can plug gaps in the low-crystalline carbon 6 to improve the number of layers and the orientation of the layer structure of the composite 7. Here, the step S3, in the case where the step S2 or S2' is carried out under pressure, may be carried out continuously or as a part of the descending temperature process, or may be omitted.

The formed composite 7 (7') is formed with a three-dimensional network structure in which the low-crystalline carbon 6 (6') is connected mutually in arbitrary directions through the fibrous carbon (nanotube 2), and is obtained as a filmy substance. In the case where the composite is used as an anode material of a lithium-ion battery, the composite can further be crushed into a predetermined particle diameter. The crushing may be carried out on the composite 7 (7') singly, but may be carried out in the course of kneading in a mixed state with a binder when a negative electrode of the lithium-ion battery is produced.

[3. A Lithium-Ion Battery]

A lithium-ion battery according to the exemplary embodiment comprises a negative electrode comprising the above carbonous anode material, a positive electrode, and an electrolyte. The lithium-ion battery according to the present invention can be used mainly as a secondary battery.

(3A. A Negative Electrode)

The carbonous anode material according to the present exemplary embodiment can be applied to a negative electrode active material of a lithium-ion battery; the use of the anode material as the negative electrode active material enables particularly the fast charge/discharge, and also enables a lithium-ion battery which is suppressed in the characteristics deterioration due to the volume expansion of the active material.

A negative electrode of the lithium-ion battery can be fabricated, for example, by forming a negative electrode active material layer comprising a negative electrode active material containing the above anode material, and a binder on a negative electrode current collector. To the negative electrode active material, there may be added known negative electrode active materials other than the anode material according to the present invention, as required. The negative electrode active material layer can be formed by a usual slurry application method. Specifically, slurry containing the negative electrode active material, the binder and a solvent is prepared, applied on a negative electrode current collector, dried, and as required, pressurized to thereby obtain a negative electrode. An application method of the negative electrode slurry includes a doctor blade method, a die coater method and a dip coating method. A negative electrode may be obtained by previously forming a negative electrode active material layer and thereafter forming a metal thin film as a current collector by a method such as vapor deposition or sputtering.

The binder for the negative electrode is not especially limited, but includes polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl (meth)acrylate, ethyl (meth)acrylate, butyl (meth) acrylate, (meth)acrylonitrile, SBR (styrene-butadiene rubber), isoprene rubber, butadiene rubber and fluororubber. As the slurry solvent, N-methyl-2-pyrrolidone (NMP) and water can be used. In the case where water is used as the solvent, as a thickener, there can be further used carboxymethyl cellulose, methyl cellulose, hydroxymethyl cellulose, ethyl cellulose and polyvinyl alcohol.

The content of the binder for the negative electrode is preferably in the range of 0.1 to 30 parts by mass, more preferably in the range of 0.5 to 25 parts by mass, and still more preferably in the range of 1 to 20 parts by mass with respect to 100 parts by mass of the negative electrode active material, from the viewpoint of the binding power and the energy density, which are in a tradeoff relationship.

The negative electrode current collector is not especially limited, but is preferably copper, nickel, stainless steel, molybdenum, tungsten, tantalum, and alloys containing two or more thereof, from the viewpoint of the electrochemical stability. Examples of its shape include a foil, a flat plate and a mesh.

(3B. A Positive Electrode)

A positive electrode can be fabricated by preparing slurry containing, for example, a positive electrode active material, a binder and a solvent (further as required, an electroconductive auxiliary material), applying, drying and as required, pressurizing the slurry on a positive electrode current collector to thereby form a positive electrode active material layer on the positive electrode current collector. As in the negative electrode, after the positive electrode active material layer is formed, a thin film for the current collector may be formed.

The positive electrode active material is not especially limited, but there can be used, for example, lithium complex oxides and iron lithium phosphate. The lithium complex oxides include lithium manganate ($LiMn_2O_4$); lithium cobaltate ($LiCoO_2$); lithium nickelate ($LiNiO_2$); compounds in which at least a part of manganese, cobalt and nickel of these lithium compounds is substituted with other metal elements such as aluminum, magnesium, titanium and zinc; nickel-substituted lithium manganates in which a part of manganese of lithium manganate is substituted with at least nickel; cobalt-substituted lithium nickelates in which a part of nickel of lithium nickelate is substituted with at least cobalt; compounds in which a part of manganese of the nickel-substituted lithium manganate is substituted with other metals (for example, at least one of aluminum, magnesium, titanium and zinc); and compounds in which a part of nickel of the cobalt-substituted lithium nickelate is substituted with other metal elements (for example, at least one of aluminum, magnesium, titanium and zinc). These lithium complex oxides may be used singly or as a mixture of two or more. With respect to the average particle diameter of the positive electrode active material, from the viewpoint of the reactivity with an electrolyte solution, the rate characteristics, and the like, there can be used the positive electrode active material having an average particle diameter, for example, in the range of 0.1 to 50 µm; preferably, there can be used the positive electrode active material having an average particle diameter in the range of 1 to 30 µm; and more preferably there can be used the positive electrode active material having an average particle diameter in the range of 5 to 25 µm. Here, the average particle diameter means a particle diameter (median diameter: $D_{50}$) at a cumulative value of 50% in a particle size distribution (in terms of volume) by the laser diffraction scattering method.

The binder for the positive electrode is not especially limited, but the same ones as the binders for the negative electrode can be used. Above all, from the viewpoint of the versatility and the cost depletion, polyvinylidene fluoride is preferable. The content of the binder for the positive electrode is preferably in the range of 1 to 25 parts by mass, more preferably in the range of 2 to 20 parts by mass, and still more preferably in the range of 2 to 10 parts by mass with respect to 100 parts by mass of the positive electrode active material, from the viewpoint of the binding power and the energy density, which are in a tradeoff relationship. The binders other than polyvinylidene fluoride (PVdF) include vinylidene fluoride-hexafluoropropylene copolymers, vinylidene fluoride-tetrafluoroethylene copolymers, polytetrafluoroethylene, polypropylene, polyethylene, polyimide, and polyamideimide. As a slurry solvent, N-methyl-2-pyrrolidone (NMP) can be used.

The positive electrode current collector is not especially limited, but from the viewpoint of the electrochemical stability, there can be used, for example, aluminum, nickel, titanium, tantalum, stainless steel (SUS), other valve metals, and alloys thereof. Examples of its shape include a foil, a flat plate and a mesh. Particularly an aluminum foil can suitably be used.

In the fabrication of the positive electrode, for the purpose of decreasing the impedance, an electroconductive auxiliary material may be added. The electroconductive auxiliary material includes carbonaceous fine particles of graphite, carbon black, acetylene black or the like.

(3C. An Electrolyte)

As an electrolyte, there can be used a nonaqueous electrolyte solution in which a lithium salt is dissolved in one or two or more nonaqueous solvents. The nonaqueous solvent is not especially limited, but examples thereof include cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carboxylate esters such as methyl formate, methyl acetate and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. Additionally as the nonaqueous solvent, there can also be used aprotic organic solvents such as dimethyl sulfoxide, 1,3-dioxolane, dioxolane derivatives, formamide, acetamide, dimethylformamide, acetonitrile, propionitrile, nitromethane, ethyl monoglyme, phosphate triesters, trimethoxymethane, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone.

The lithium salt dissolved in the nonaqueous solvent is not especially limited, but examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bisoxalatoborate. These lithium salts can be used singly or in a combination of two or more. Further a polymer electrolyte may be used in place of the nonaqueous electrolyte solution.

(3D. A Battery Constitution)

A battery can be constituted by making the corresponding active material layers of the above positive electrode and negative electrode to face each other, and filing the above electrolyte therebetween. Further a separator can be disposed between the positive electrode and the negative electrode. As the separator, there can be used porous films, woven fabrics and nonwoven fabrics composed of polyolefins such as polypropylene and polyethylene, fluororesins such as polyvinylidene fluoride, polyimide and the like.

The examples of the battery include cylindrical shapes, rectangular shapes, coin types, button types and laminate types. In the case of the laminate type, as an outer package to accommodate the positive electrode, the separator, the negative electrode and the electrolyte, a laminate film is preferably used. The laminate film contains a resin base material, a metal foil layer and a heat sealing layer (sealant). The resin base material includes polyester and polyamide (nylon); and the metal foil layer includes foils of aluminum, an aluminum alloy and titanium foil. The material of the heat sealing layer includes thermoplastic polymeric materials such as polyethylene, polypropylene and polyethylene terephthalate. Further the resin base material layer and the metal foil layer are each not limited to one layer, and may be two or more layers. From the viewpoint of the versatility and the cost, an aluminum laminate film is preferable.

The positive electrode, the negative electrode and the separator arranged therebetween are accommodated in an outer package container composed of a laminate film or the like; and in the case of using a nonaqueous electrolyte solution; the electrolyte solution is injected and sealed. The battery structure may be made a structure in which an electrode group in which a plurality of electrode pairs is laminated is accommodated.

EXAMPLES

Hereinafter, the exemplary embodiment will be described in more detail by way of Examples, but the present invention is not any more limited to these Examples.

Example 1

Figure 3:
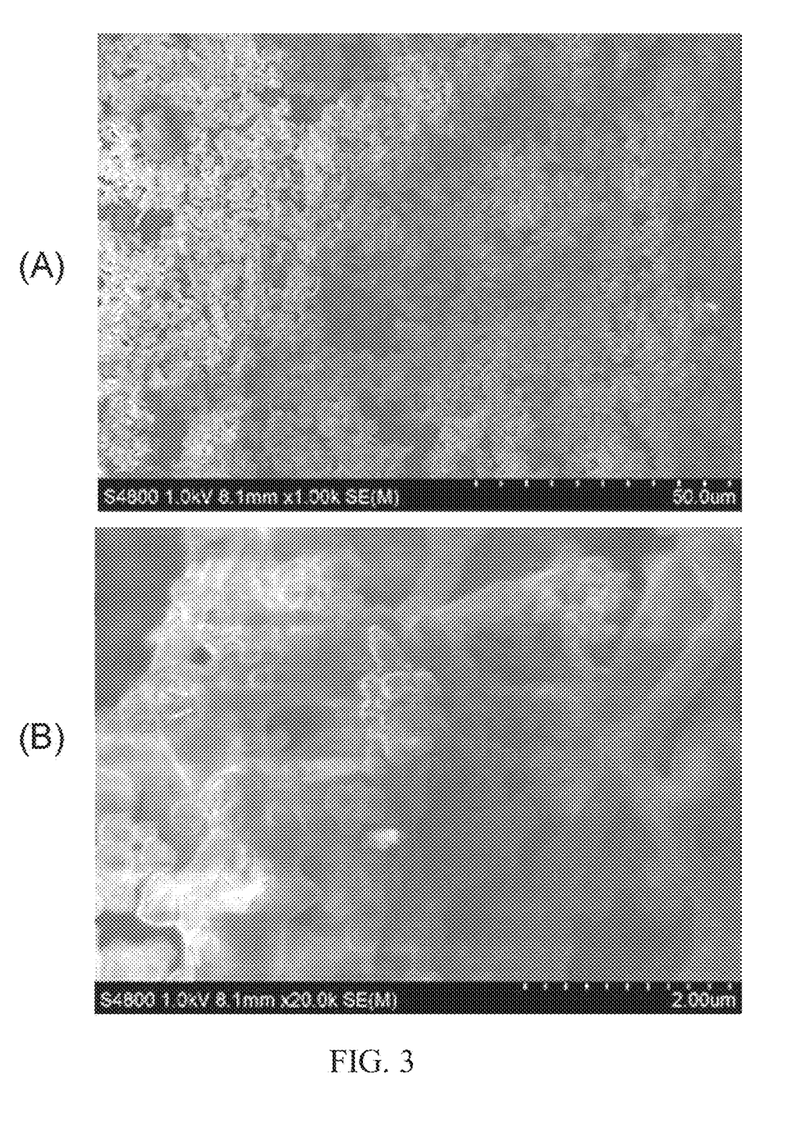
FIG. 3 They are SEM images of a preparation after being heat-treated in an autoclave, obtained in Example 1; (A) shows a SEM image at a magnification of 1,000; and (B) shows a SEM image at a magnification of 20,000.
Figure 4:
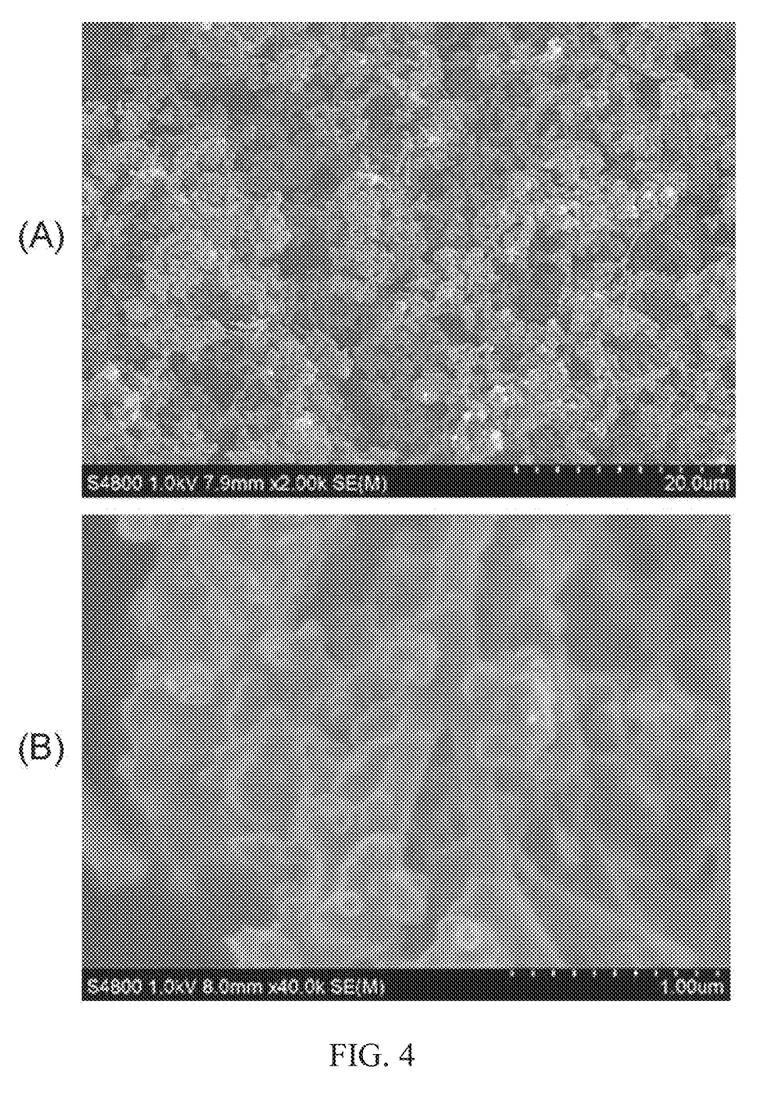
FIG. 4 They are SEM images of a carbon composite 1 obtained in Example 1; (A) shows a SEM image at a magnification of 2,000; and (B) shows a SEM image at a magnification of 40,000.

100 mg of a carbon nanohorn (untreated) and 100 mg of a carbon nanotube (VGCF) were charged in an aqueous sucrose solution (0.2 mol/L, water/ethanol: 360/40 mL), and subjected to ultrasonic dispersion for 3 min to thereby obtain a mixed liquid. The mixed liquid was subjected to heat treatment using an autoclave apparatus under a pressure of 10 MPa at 200° C. for 4 hours to carbonize the sucrose in the liquid; and the obtained preparation was baked in an argon atmosphere at 800° C. for 3 hours to thereby obtain a carbon composite 1. FIG. 3 is SEM images of the preparation after the autoclave treatment; FIG. 3(A) shows a SEM image at a magnification of 1,000, and FIG. 3(B) shows a SEM image at a magnification of 20,000. At this stage, the degree of crystallinity of the carbonized substance was low, and particularly as shown in FIG. 3(B), the carbonized substance was seen shining due to the charge up. FIG. 4 is SEM images of the carbon composite 1; and FIG. 4(A) is a SEM image at a magnification of 2,000, and FIG. 4(B) is a SEM image at a magnification of 40,000. It is clear that little charge up was caused as compared with FIG. 3 and the conversion to the low-crystalline carbon was accomplished. Further the concentration of the aqueous sucrose solution was increased (to 0.5 mol/L, water/ethanol: 360/40 mL), and with 100 mg of the carbon nanohorn (untreated) and 100 mg of the carbon nanotube (VGCF), a final carbon composite 1' became large in size of the low-crystalline carbon as compared with FIG. 4.

Example 2

A phenol resin (1 g), 100 mg of the carbon nanohorn (untreated) and 100 mg of the carbon nanotube (VGCF) were charged in N,N-dimethylformamide (DMF), and dispersed with ultrasonic waves for 5 min. Thereafter, the solvent was removed with a filter. Thus obtained preparation was subjected to a heat treatment in an Ar atmosphere at 1,200° C. for 3 hours (carbon composite 2).

Comparative Example 1

The aqueous sucrose solution (0.2 mol/L, water/ethanol: 360/40 mL) was subjected to a heat treatment using an autoclave apparatus under a pressure of 10 MPa at 200° C. for 4 hours to be thereby carbonized, and the obtained preparation was baked in an argon atmosphere at 800° C. for 3 hours to thereby obtain a low-crystalline carbon. In thus obtained preparation, 100 mg of the carbon nanohorn (untreated) and 100 mg of the carbon nanotube (VGCF) were mixed (nano carbon mixture 1).

Comparative Example 2

The phenol resin (1 g) was subjected to a heat treatment in an Ar atmosphere at 1,200° C. for 3 hours to thereby obtain a low-crystalline carbon. In thus obtained preparation, 100 mg of the carbon nanohorn (untreated) and 100 mg of the carbon nanotube (VGCF) were mixed (nano carbon mixture 2).

80% by mass of a preparation fabricated in Examples 1 and 2 and Comparative Examples 1 and 2 each and 20% by mass of a polyvinylidene fluoride (PVDF) were mixed, and further mixed with N-methyl-2-prorridinone and fully stirred to thereby prepare a negative electrode slurry. The negative electrode slurry was applied in a thickness of 100 μm on a copper foil of 10 μm in thickness. Thereafter, the resultant was dried at 120° C. for 1 hour, and roller-pressed to thereby mold an electrode. Further the electrode was punched into 2 cm$^2$ to thereby fabricate a negative electrode. A lithium ion secondary battery (test cell) was fabricated by using the obtained negative electrode, a Li foil as its positive electrode, an electrolyte solution and a separator. The electrolyte solution was prepared by dissolving $LiPF_6$ in a concentration of 1 M in a mixed solvent of ethylene carbonate and methyl ethyl carbonate (volume ratio: 3:7). The separator used was a polyethylene porous film of 30 μm.

For the fabricated secondary batteries, charge and discharge characteristics were examined as follows. First, a secondary battery was set on a charge and discharge tester; and charging was carried out at a constant current of 0.5 mA/cm$^2$ until the voltage reached 0.02 V; and charging was carried out by reducing the current in the state of 0.02 V. Then, at the time when the current value became 60 μA/cm$^2$, the charging was terminated. Discharging was carried out at a constant current of 0.5 mA/cm$^2$, and terminated at the time when the cell voltage reached 2.0 V; and the discharge capacity was determined. The cycle characteristics were examined by repeating this operation 50 times. Further, after the charging, by discharging at 5, 20, 40 and 80 mA/g, the rate characteristics were evaluated. Comparing the batteries on the same rate, it was found that the secondary batteries according to the present exemplary embodiment were more improved in the discharge characteristic and the capacity maintenance rate. The results are shown in Table 1 collectively.

TABLE 1

|  | Discharge Capacity (mAh/g) | | | | Capacity retention after cycle test |
| --- | --- | --- | --- | --- | --- |
|  | Discharge (5 mA/g) | Discharge (20 mA/g) | Discharge (40 mA/g) | Discharge (80 mA/g) |  |
| Example 1 | 520 mAh/g | 520 mAh/g | 510 mAh/g | 485 mAh/g | 90% |
| Example 2 | 480 mAh/g | 480 mAh/g | 475 mAh/g | 465 mAh/g | 92% |
| Comparative Example 1 | 525 mAh/g | 520 mAh/g | 500 mAh/g | 470 mAh/g | 85% |
| Comparative Example 2 | 480 mAh/g | 480 mAh/g | 465 mAh/g | 440 mAh/g | 88% |

Hitherto, the present invention has been described by way of the exemplary embodiment and the Examples, but the present invention is not limited to the exemplary embodiment and the Examples. Various changes and modifications understandable to those skilled in the art may be made on the constitution and the detail of the present invention within the scope of the present invention.

The present application claims priority to Japanese Patent Application No. 2013-173621, filed on Aug. 23, 2013, the entire disclosure of which is hereby incorporated by reference.

REFERENCE SIGNS LIST

1 LOW-CRYSTALLINE CARBON PRECURSOR
2 CARBON NANOTUBE
3 CARBON NANOHORN AGGREGATE
4 DISPERSE MEDIUM
5 SUPPORTED NANOHORN
6, 6' LOW-CRYSTALLINE CARBON
7, 7' COMPOSITE

8 PRECURSOR SOLUTION
9 MIXED LIQUID
10 CARBONIZED SUBSTANCE

What is claimed is:

1. A carbonous anode material comprising a composite of a low-crystalline carbon, a fibrous carbon having a smaller diameter than a particle diameter of the low-crystalline carbon, and a carbon nanohorn,
wherein the composite comprises the carbon nanohorn incorporated in the inside of and in the vicinity of the surface of the low-crystalline carbon, and the fibrous carbon incorporated in a plurality of particles of the low-crystalline carbon and connecting through the plurality of particles of the low-crystalline carbon.

2. A lithium-ion battery comprising, as a negative electrode active material, a carbonous anode material according to claim 1.

3. The carbonous anode material according to claim 1, wherein the carbon nanohorn is a globular carbon nanohorn aggregate.

4. The carbonous anode material according to claim 3, wherein the composite comprises a graphene sheet structure having a pore in a part thereof.

5. The carbonous anode material according to claim 3, wherein the fibrous carbon is a carbon nanotube.

6. The carbonous anode material according to claim 3, wherein the composite comprises 0.1 to 20% by mass of the globular carbon nanohorn aggregate, 0.1 to 20% by mass of the fibrous carbon and the remainder of the low-crystalline carbon.

7. A lithium-ion battery comprising, as a negative electrode active material, a carbonous anode material according to claim 3.

* * * * *